(12) United States Patent
Mochizuki

(10) Patent No.: US 8,645,028 B2
(45) Date of Patent: Feb. 4, 2014

(54) GRILLE CONTROL MECHANISM FOR VEHICLE

(75) Inventor: Hiroki Mochizuki, Kariya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 437 days.

(21) Appl. No.: 12/942,566

(22) Filed: Nov. 9, 2010

(65) Prior Publication Data

US 2011/0118945 A1    May 19, 2011

(30) Foreign Application Priority Data

Nov. 19, 2009    (JP) ................................ 2009-264026

(51) Int. Cl.
*F01P 11/10*    (2006.01)
*B60K 11/08*    (2006.01)
*G06F 1/00*    (2006.01)

(52) U.S. Cl.
USPC ......... 701/49; 701/36; 123/41.05; 123/41.06; 180/68.1; 454/75

(58) Field of Classification Search
USPC .......... 701/49, 1, 36; 454/75, 143; 296/180.3; 123/41.05, 41.04, 41.06; 180/68.1, 180/68.3
See application file for complete search history.

(56) References Cited

U.S. PATENT DOCUMENTS

| | | | |
|---|---|---|---|
| 4,475,485 A | | 10/1984 | Sakakibara et al. |
| 4,641,073 A | * | 2/1987 | Sawada .................. 318/696 |
| 4,779,577 A | | 10/1988 | Ritter et al. |
| 6,659,423 B1 | * | 12/2003 | Dauvergne et al. ...... 251/129.11 |
| 8,281,754 B2 | * | 10/2012 | Saida et al. ............... 123/41.04 |
| 2006/0157659 A1 | * | 7/2006 | MacGregor et al. ........... 251/11 |
| 2008/0133090 A1 | * | 6/2008 | Browne et al. .................. 701/49 |
| 2009/0050385 A1 | * | 2/2009 | Guilfoyle et al. ............ 180/68.1 |

FOREIGN PATENT DOCUMENTS

| | | |
|---|---|---|
| EP | 0 084 378 A1 | 7/1983 |
| EP | 0 254 815 A2 | 2/1988 |
| JP | 5-50861 | 3/1993 |
| JP | 2007-320527 | 12/2007 |
| JP | 2008-6855 | 1/2008 |

OTHER PUBLICATIONS

U.S. Appl. No. 12/942,694, filed Nov. 9, 2010, Kawato.
Extended European Search Report issued on Mar. 1, 2011 in the corresponding European Appliction No. 10190869.7.

* cited by examiner

*Primary Examiner* — Christine Behncke
(74) *Attorney, Agent, or Firm* — Oblon, Spivak, McClelland, Maier & Neustadt, L.L.P.

(57) ABSTRACT

A grille control mechanism for a vehicle includes a movable member being switchable between an opened position for allowing air to flow into a radiator of the vehicle and a closed position for inhibiting the air from flowing into the radiator, an electric motor actuating the movable member, and a control device controlling an electric current to be supplied to the electric motor to execute an opening operation or a closing operation of the movable member in a case where an opening operation condition or a closing operation condition is satisfied, wherein the control device controlling the electric current to be intermittently supplied in response to one of the opening operation condition and the closing operation condition maintained until the other one of the opening operation condition and the closing operation condition is satisfied after the opening operation or the closing operation corresponding to the maintained operation condition is executed.

7 Claims, 5 Drawing Sheets

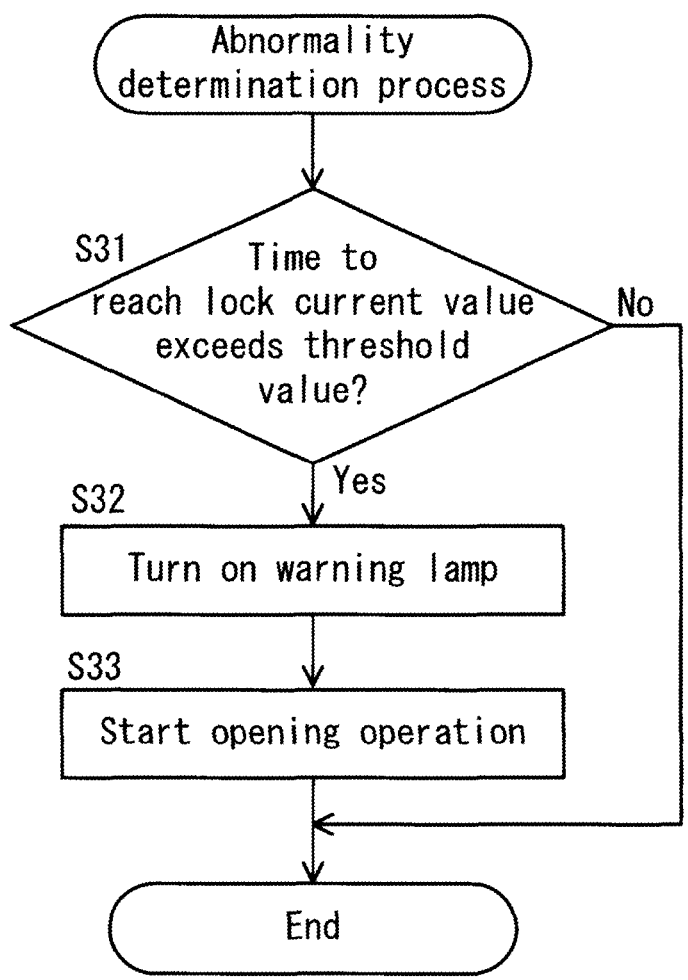

GRILLE CONTROL MECHANISM FOR VEHICLE

CROSS REFERENCE TO RELATED APPLICATIONS

This application is based on and claims priority under 35 U.S.C. §119 to Japanese Patent Application 2009-264026, filed on Nov. 19, 2009, the entire content of which is incorporated herein by reference.

TECHNICAL FIELD

This disclosure generally relates to a grille control mechanism for a vehicle for controlling an opening and closing operation of a movable member, which is configured so as to be switchable between an opening position for allowing ambient air to flow into a radiator provided at the vehicle and a closing position for inhibiting or restricting the ambient air from flowing into the radiator.

BACKGROUND

Disclosed in JP2008-6855A is an example of a known grille control mechanism for a vehicle. According to the grille control mechanism for the vehicle disclosed in JP2008-6855A, a movable member is provided between a front grille and a radiator of the vehicle, so that an aerodynamic characteristic of the vehicle, an engine temperature and the like is adjusted by adjusting inflow of air from a front portion of the vehicle to the radiator, in order to achieve a preferable driving performance of the vehicle. More specifically, the movable member is configured as a movable fin, which is pivotable about a horizontal axis. Accordingly, the inflow of the air is adjusted by controlling an air inlet passage to be opened and closed by the movable fin so that air resistance, lift force or downforce is applied to the vehicle in order to ensure a stable driving performance of the vehicle.

Disclosed in JPH5-50861A is another example of a known grille control mechanism for a vehicle. According to the grille control mechanism for the vehicle disclosed in JPH5-50861A, a movable member (a movable grille) is controlled to be opened and closed in response to an environmental condition (e.g. ambient temperature and the like) and an engine load condition (e.g. a temperature of an engine cooling medium and the like). The grille control mechanism for the vehicle disclosed in JPH5-50861A estimates an opening-closing state of the movable member, by which an appropriate cooling effect is supposed to be obtained under a certain environmental condition and the engine load condition, on the basis of plural determination conditions, which are stored within a storing means. Then, the grille control mechanism executes an opening-closing control of the movable member on the basis of the estimation result in order to adjust cooling of the engine cooling medium to be appropriate.

Both of the grille control mechanism disclosed in JP2008-6855A and the grille control mechanism disclosed in JPH5-50861A are intended to improve the cooling of the engine cooling medium, to achieve a driving stability of the vehicle and the like by controlling the movable member to be at the opened position or the closed position on the basis of each condition. Therefore, in a case where the movable member is displaced from a proper position, where the movable member should be, because of window pressure, an impact and the like applied to the movable member while moving, the engine cooling medium may not be sufficiently cooled or a driving stability of the vehicle may deteriorate.

In other words, in a case where the movable member is closed independently of the control even if the grille control mechanism controls the movable position to be at the opened position in order to cool the cooling medium by inletting the air into the radiator, overheating may occur at the engine because the cooling medium is not sufficiently and appropriately cooled down. Furthermore, in a case where the movable member is opened independently of the control even if the movable member is controlled to be at the closed position so that the downforce is generated at the vehicle in order to obtain the driving stability of the vehicle, the expected driving stability may not be obtained.

A need thus exists to provide a grille control mechanism for a vehicle which is not susceptible to the drawback mentioned above.

SUMMARY

According to an aspect of this disclosure, a grille control mechanism for a vehicle includes a movable member, whose position is switchable between an opened position for allowing an ambient air to flow into a radiator provided at the vehicle and a closed position for inhibiting or restricting the ambient air from flowing into the radiator, an electric motor actuating the movable member, and a control device controlling an electric current to be supplied to the electric motor in order to execute an opening operation or a closing operation of the movable member in a case where an opening operation condition for controlling the movable member to be at the opened position or a closing operation condition for controlling the movable member to be at the closed position is satisfied, wherein the control device controlling the electric current to be intermittently supplied to the electric motor in response to one of the opening operation condition and the closing operation condition, which is maintained, until the other one of the opening operation condition and the closing operation condition is satisfied after the opening operation or the closing operation of the movable member corresponding to the maintained operation condition is executed.

BRIEF DESCRIPTION OF THE DRAWINGS

The foregoing and additional features and characteristics of this disclosure will become more apparent from the following detailed description considered with the reference to the accompanying drawings, wherein:

FIG. 5 is a flowchart illustrating an abnormality determination process.

DETAILED DESCRIPTION

An embodiment of a grille control mechanism for a vehicle will be described below with reference to the attached drawings of FIGS. 1 to 5.

Figure 1:
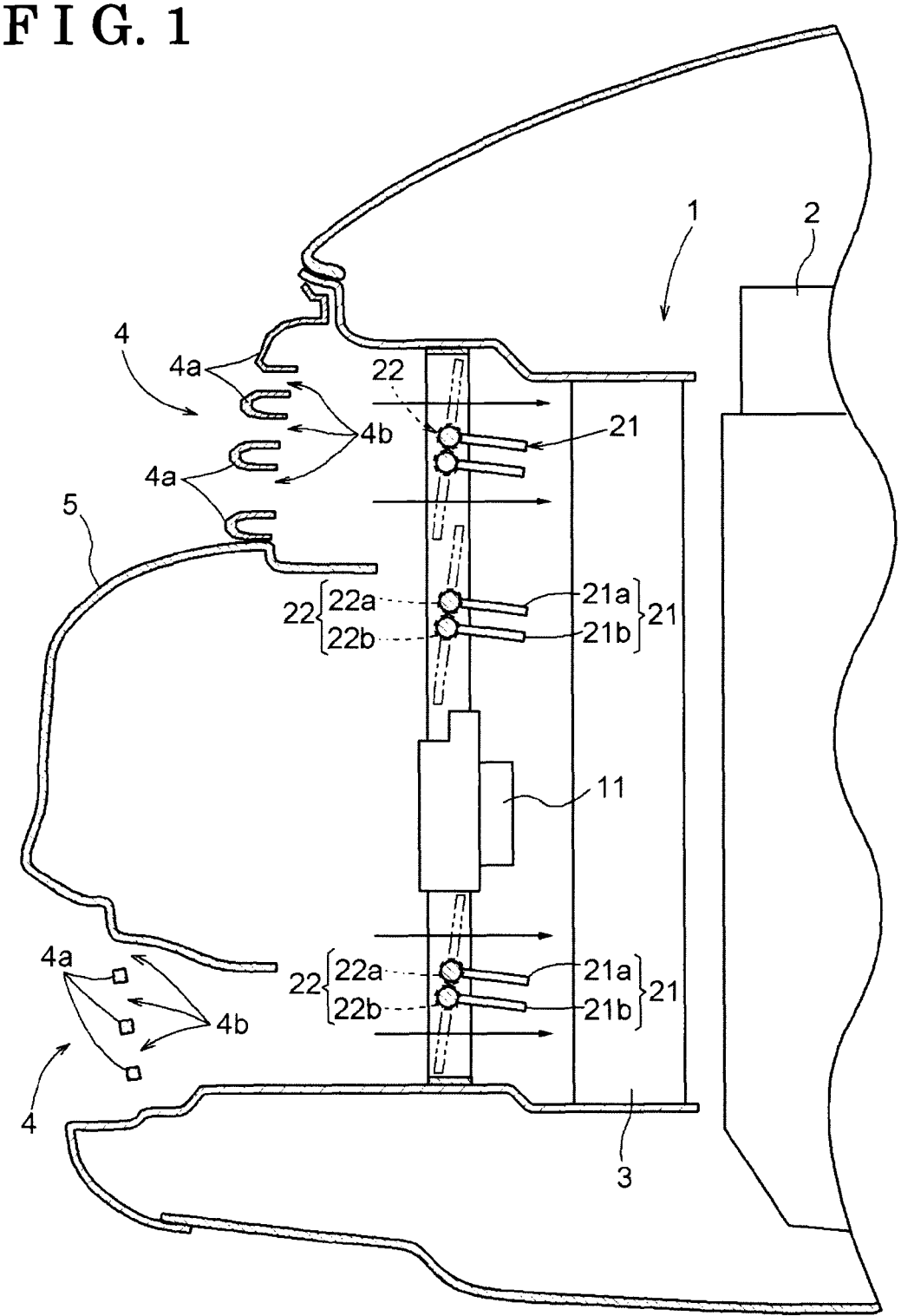
FIG. 1 is a cross-sectional diagram illustrating a front portion of a vehicle in a case where a movable member is at an opened position.
Figure 2:
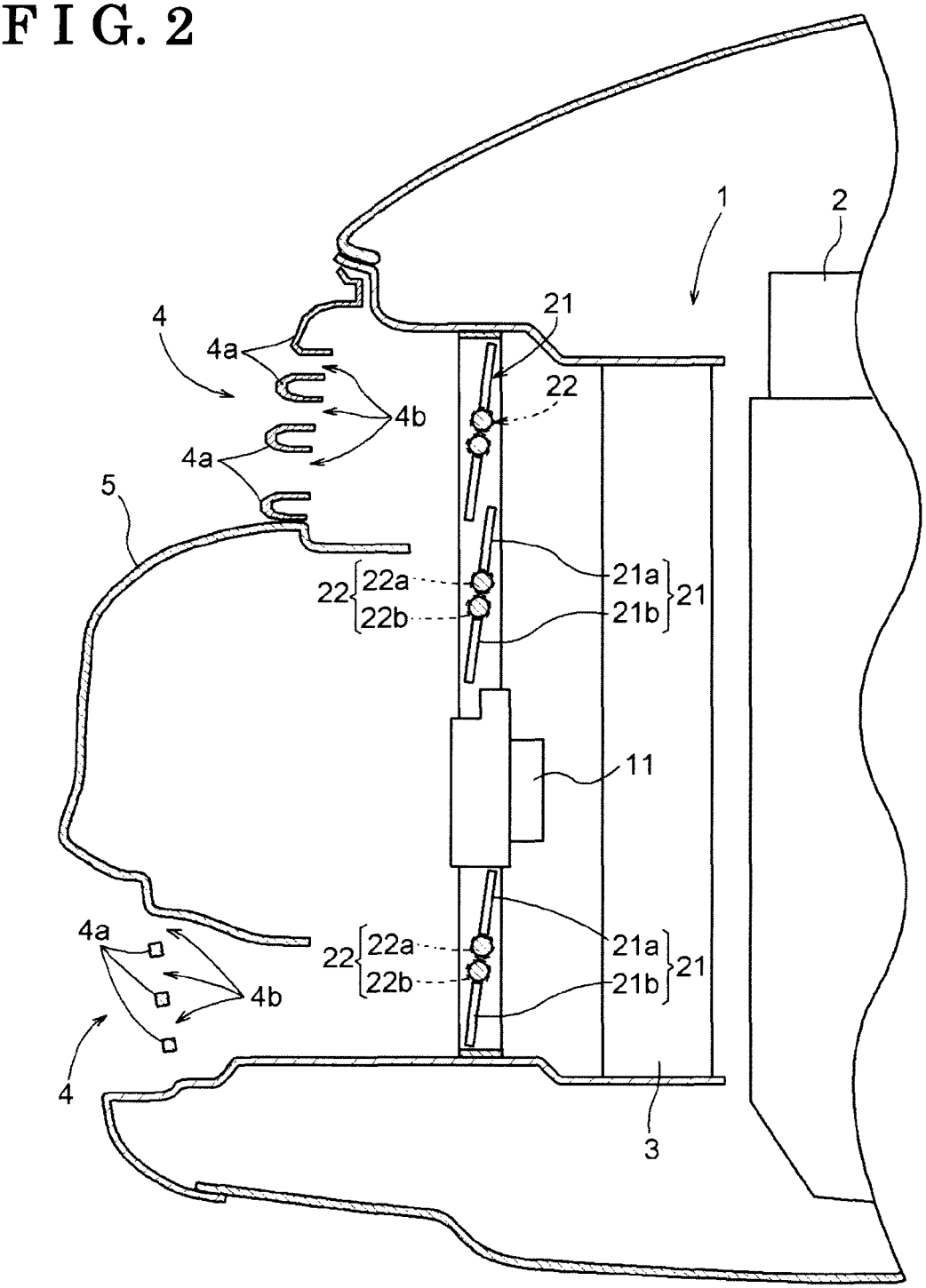
FIG. 2 is a cross-sectional diagram illustrating the front portion of the vehicle in a case where the movable member is at a closed position.

Illustrated in FIG. 1 is a cross-sectional diagram of a front portion of the vehicle in a case where a movable member 21 is at an opened position. In this embodiment, plural movable members 21 are provided at the vehicle. On the other hand, illustrated in FIG. 2 is a cross-sectional diagram of the front portion of the vehicle in a case where the movable members 21 are at a closed position. As illustrated in FIGS. 1 and 2, an engine 2 and a radiator 3 for cooling a cooling medium of the engine 2 are mounted in an engine room 1. The movable members 21 are provided in front of the radiator 3 in a front-rear direction of the vehicle. The movable members 21 are controlled to be opened and closed by a control means 11 (a control device), so that air inlet from a front grille 4 is controlled to be allowed and inhibited to flow into the engine room 1. The front grilles 4 are provided above and below a bumper 5. More specifically, each front grille 4 includes frame portions 4a mainly forming a design of the front grille 4 and opening portions 4b for allowing the air (ambient air) to flow towards the engine room 1.

Each of the movable members 21 includes a main movable member 21a and a driven member 21b. Furthermore, each of the movable members 21 is configured so that the main movable member 21a and the driven member 21b, which are arranged adjacent to each other, are actuated together as a unit. A rotating shaft 22 (in this embodiment, plural rotating shafts 22 are provided) includes a first rotating shaft 22a and a second rotating shaft 22b. The first rotating shafts 22a, which are connected to end portions of the main movable members 21a, respectively, and which extend in a vehicle width direction, and the second rotating shafts 22b, which are connected to end portions of the driven member 21b, respectively, and which extend in the vehicle width direction, are operated together as a unit via a gear. Accordingly, a force (a rotational force) generated by an electric motor 12 (see FIG. 3), which is actuated in response to a command outputted from the control means 11, is directly transmitted to the main movable members 21a via the corresponding first rotating shafts 22a. The force, which is generated by the electric motor 12 and is transmitted through a transmission system, is also transmitted to the second rotating shafts 22b via the gear, so that the driven members 21b are simultaneously rotated together with the corresponding main movable members 21a.

As illustrated in FIG. 1, in the case where the movable members 21 are at the opened position, the air introduced from the front grilles 4 is allowed to flow into the engine room 1 and facilitates the cooling of the cooling medium, which flows inside of the radiator 3. On the other hand, in the case where the movable members 21 are at the closed position, as illustrated in FIG. 2, the air introduced from the front grilles 4 does not inflow into the engine room 1. Therefore, in this case, air resistance, a lift force and the like acting on the vehicle becomes smaller. Furthermore, in this case, the air blocked by the movable members 21 from entering into the engine room 1 flows under a floor of the vehicle and generates a downforce on the vehicle. Therefore, in the case where the movable members 21 are controlled to be at the closed position, a driving stability of the vehicle may be enhanced.

Figure 3:
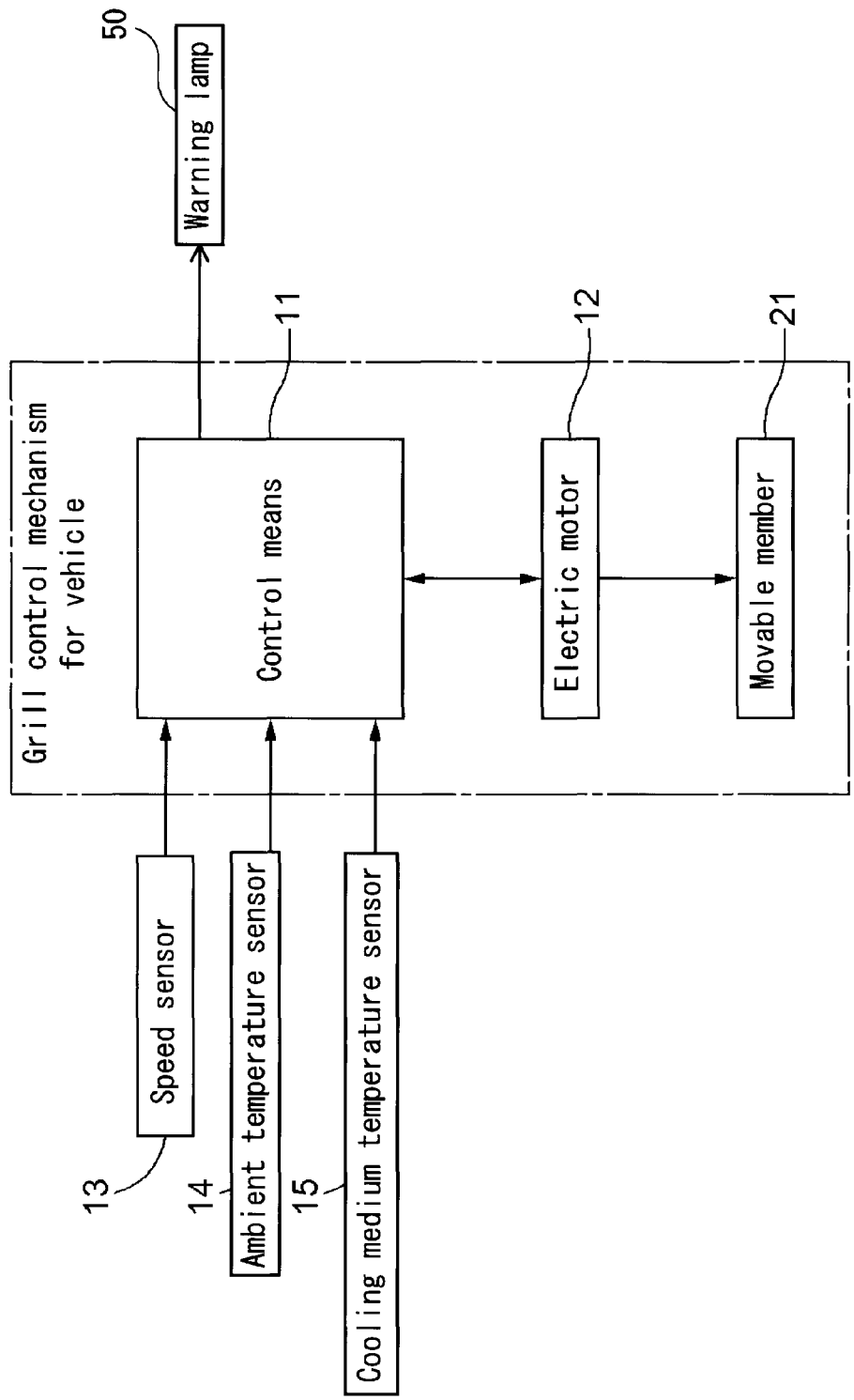
FIG. 3 is a diagram illustrating a configuration of a grille control mechanism for the vehicle according to an embodiment.
Figure 4:
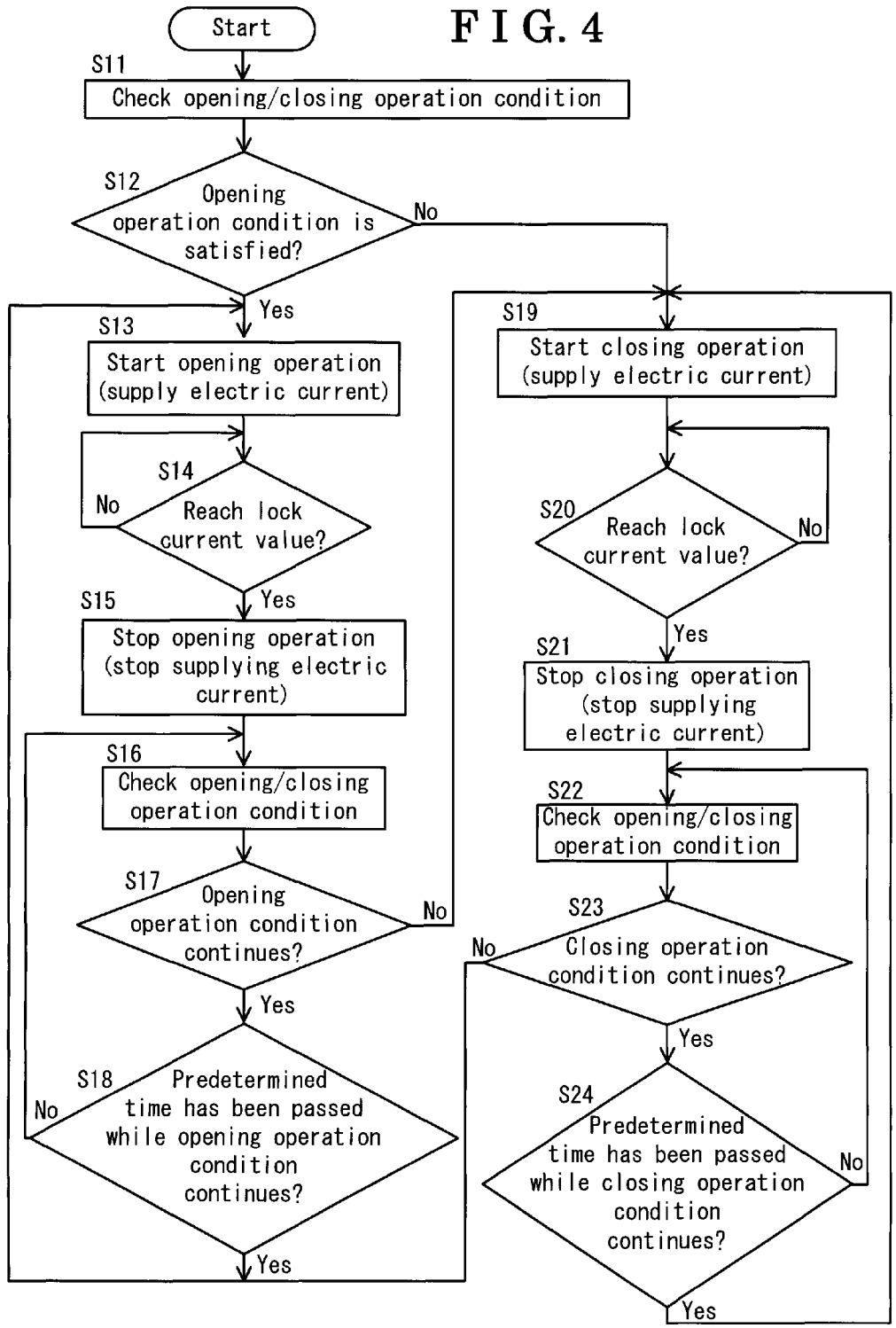
FIG. 4 is a flowchart illustrating a control executed by a control means.

Illustrated in FIG. 3 is a configuration of the grille control mechanism for the vehicle. The control means 11 reads out detection values from a speed sensor 13, an ambient temperature sensor 14 and a cooling medium temperature sensor 15. Then, the control means 11 determines whether or not an opening operation condition for controlling the movable members 21 to be at the opened position is satisfied on the basis of the detection values and determines whether or not a closing operation condition for controlling the movable members 21 to be at the closed position is satisfied on the basis of the detection values. For example, in a case where a speed, which is detected by the speed sensor 13, is determined to be great, the control means 11 executes the closing operation (i.e. controlling the movable members 21 to be at the closed position) in order to ensure and enhance the driving stability of the vehicle. On the other hand, in a case where a cooling medium temperature, which is detected by the cooling medium temperature sensor 15, is determined to be high, the control means 11 executes the opening operation (i.e. controlling the movable members 21 to be at the opened position) in order to effectively cool down the cooling medium.

In this embodiment, the control means 11 executes the determination of the opening operation condition and the closing operation condition on the basis of the detection values from the speed sensor 13, the ambient temperature sensor 14 and the cooling medium temperature sensor 15. However, a determination factor for the opening operation condition and the closing operation condition is not limited to the above-mentioned detection values. For example, a detection value from other sensor may be used as a determination factor.

In the case where the control means 11 determines that the opening operation or the closing operation needs to be executed, an electric current is supplied to the electric motor 12, thereby actuating the movable members 21. Furthermore, the control means 11 monitors the electric current supplied to the electric motor 12, so that the control means 11 stops the electric current to be supplied to the electric motor 12 in a case where the control means 11 determines that movable members 21 reach the opened position or the closed position when a current value reaches a lock current value. The lock current value is detected when the movable members 21 reach a mechanical end portion, beyond which the movable members 21 are not movable. Accordingly, because the control means 11 determines whether or not the movable members 21 reach the opened position or the closed position based on whether or not the current value, which is applied to the electric motor 12, reaches the lock current value, a sensor for detecting a position of the movable member 21 does not need to be additionally provided at the grille control mechanism. As a result, manufacturing costs of the grille control mechanism may be reduced. Furthermore, the grille control mechanism may be more flexibly mounted to various types of vehicle because a size of the grille control mechanism is decreased when comparing to a known grille control mechanism. In this embodiment, the control means 11 determines whether or not the movable members 21 reach the opening position or the closing position on the basis of whether or not the current value reaches the lock current value. However, the control means 11 may be modified so as to determine whether or not the movable members 21 reach the opening position or the closing position based on a time duration for supplying the electric current to the electric motor 12.

The grille control mechanism for the vehicle according to the embodiment is configured so as to adjust an actual position of the movable members 21 to correspond to a position where the movable members 21 should be (i.e. a proper position), which is determined based on the operation condition, in a case where the actual position of the movable members 21 does not correspond to the position where the movable members 21 should be while the opening operation condition or the closing operation condition of the movable members 21 are maintained (continues). A control executed by the control means 11 of the grille control mechanism for adjusting the actual position of the movable members 21 to correspond to the position where the movable members 21 should be, will be described below.

The control means 11 reads out the detection values from the speed sensor 13, the ambient temperature sensor 14 and the cooling medium temperature sensor 15 when the engine 2 is started. Then, the control means 11 determines whether the opening operation condition for controlling the movable members 21 to be at the opened position or the closing operation condition for controlling the movable members 21 to be at the closed position is satisfied on the basis of the detection values (step S11). In a case where the control means 11 concludes that the opening operation condition is satisfied (Yes in step S12), the control means 11 controls the electric current to be supplied to the electric motor 12 in order to start the opening operation of the movable members 21 (step S13). On the other hand, in a case where the control means 11 determines that the closing operation condition, not the opening operation condition, is satisfied (No in step S12), the control means 11 controls the electric current to be supplied to the electric motor 12 in order to start the closing operation of the movable members 21 (step S19).

When the movable members 21 are started and actuated so as to open in response to the force applied thereto from the electric motor 12 (step S13), the control means 11 monitors the current value applied to the electric motor 12 in order to continually check whether or not the current value reaches the lock current value (step S14). In a case where the current value applied to the electric motor 12 does not reach the lock current value (No in step S14), the control means 11 controls the electric current to be continuously supplied to the electric motor 12. On the other hand, in a case where the current value reaches the lock current value (Yes in step S14), the control means 11 determines that the movable members 21 reach the opened position and controls the supply of the electric current to the electric motor 12 to be stopped in order to stop the opening operation of the movable members 21 (step S15).

The control means 11 normally reads out the detection values from the speed sensor 13, the ambient temperature sensor 14 and the cooling medium temperature sensor 15 in order to check whether the opening operation condition for controlling the movable members 21 to be at the opened position or the closing operation condition for controlling the movable members 21 to be at the closed position is satisfied on the basis of the detection values (step S16). In a case where the control means 11 concludes that the opening operation condition of the movable members 21 is maintained (continues) (Yes in step S17), the control means 11 determines whether or not a duration time of the opening operation condition has elapsed a predetermined time, which has preliminarily set (step S18).

In a case where the time duration of the opening operation condition has not elapsed the predetermined time (No in step S18), the control means 11 repeats processes of steps S16 to S18. On the other hand, in a case where the time duration of the opening operation condition has elapsed the predetermined time (Yes in step S18), the control means 11 controls the electric current to be supplied to the electric motor 12 in order to start the opening operation of the movable members 21 (step S13). In this case, when the movable members 21 are at the opened position, the electric current supplied to the electric motor 12 immediately reaches the lock current value. On the other hand, when the movable members 21 are positioned away from the opened position, a certain amount of time is needed until the electric current supplied to the electric motor 12 reaches the lock current value. In any case, after the electric current supplied to the electric motor 12 reaches the lock electric value (Yes in step S14), the control means 11 repeats the processes of steps S15 to S18.

Described above is the control executed when the opening operation condition is satisfied and then, the opening operation condition continues (is maintained). A similar control is executed when the closing operation condition is satisfied and then, the closing operation condition continues (steps S19 to S24). In other words, the control to be executed when the closing operation condition is satisfied and then, the closing operation condition continues will be explained by replacing "the opening operation" in steps S13 to S18 by "the closing operation" in the above-mentioned explanation (see steps S19 to S24).

In a case where the control means 11 determines that the opening operation condition is not continued in step S17 (No in step S17), in other words, in a case where the control means 11 determines that condition is shifted to the closing operation condition from the opening operation condition, the control means 11 controls the electric current to be supplied to the electric motor 12 and starts the closing operation of the movable members 21 (step S19). Similarly, in a case where the control means 11 determines that the closing operation condition is not continued in step S23 (No in step S23), in other words, in a case where the control means 11 determines that the condition is shifted to the opening operation condition from the closing operation condition, the control means 11 controls the electric current to be supplied to the electric motor 12 and starts the opening operation of the movable members 21 (step S13).

Accordingly, because the above-mentioned control is executed, the opening operation is executed every predetermined time while the opening operation condition is maintained, and the closing operation is executed every predetermined time while the closing operation condition is maintained. Therefore, even in a case where the movable members 21 are unexpectedly displaced towards the closed position from the opened position because of air pressure, an impact and the like applied to the movable members 21 while the opening operation condition continues, the movable members 21 are returned to the opened position after the predetermined time has elapsed. As a result, a drawback such as the cooling medium not appropriately being cooled down by the radiator 3 and the like may be avoided. Similarly, even in a case where the movable members 21 are unexpectedly displayed displaced towards the opened position from the closed position because of the air pressure, the impact and the like applied to the movable members 21 while the closing operation condition continues, the movable members 21 are returned to the closed position after the predetermined time has elapsed. As a result, the driving stability of the vehicle may be ensured.

Generally, in the case where the movable members 21 are displaced towards the closed position from the opened position while the opening operation condition is maintained, the engine cooling medium may not be sufficiently cooled down by the radiator 3, which may result in generating overheating at the engine 2. On the other hand, in the case where the movable members 21 are displaced towards the opened position from the closed position while the closing operation condition is maintained, the driving stability of the vehicle may deteriorate. Preventing the overheating is considered more important than ensuring the driving stability of the vehicle. Therefore, in this embodiment, the predetermined time set for the case where the opening operation condition continues is set to be shorter than the predetermined time set for the case where the closing operation condition continues in order to execute the opening operation more frequently than the closing operation.

An abnormality determination process executed while the opening operation condition is maintained or while the closing operation condition is maintained will be described below with reference to a flowchart illustrated in FIG. 5. The abnormality determination process is executed after the process at step S14 or step S20 is executed. In other words, the abnormality determination process is executed after the predetermined time has elapsed while the opening operation condition or the closing operation condition continues, the electric current is supplied to the electric motor 12 in order to execute the opening operation or the closing operation and then, the electric current supplied to the electric motor 12 reaches the lock current value.

In a case where a time until the electric current supplied to the electric motor 12 reaches the lock current value exceeds a preliminarily set threshold value (Yes in step S31), it is considered that a time for the movable members 21 to be displaced to a position appropriate to the continued operation condition is long, in other words, the movable members 21 are greatly displaced from the opened position or the closed position where the movable members 21 should be (i.e. a position where the movable members 21 are considered to be located). Therefore, in this case, the control means 11 determines that an abnormality occurs at grille control mechanism. On the other hand, in a case where the time (a duration of time) for the electric current supplied to the electric motor 12 reaching the lock current value does not exceed the threshold value (No in step S31), the control means 11 determines that no significant abnormality or error occurs at the grille control mechanism and ends the abnormality determination process.

In the case where the control means 11 determines that the abnormality occurs at the grille control mechanism, the control means 11 activates (turning on) a warning lamp 50, which is provided at a position visible to an occupant, in order to inform the occupant that the abnormality occurs (step S32). Furthermore, the control means 11 controls the electric current to be supplied to the electric motor 12 in order to forcibly execute the opening operation of the movable members 21 (step S33). This is because, as mentioned above, preventing the overheating from occurring is considered to be more important than preventing the deterioration of the driving stability of the vehicle. Therefore, in this case, the movable members 21 are moved to the opened position in order to facilitate the cooling of the cooling medium, which flows the inside of the radiator 3.

In this embodiment, the control means 11 is configured so as to determine that the abnormality occurs at the grille control mechanism in the case where the time until the electric current supplied to the electric motor 12 reaches the lock current value exceeds the threshold value even once. However, the control means 11 may be modified so as to execute the abnormality determination in view of a number of times or frequency when the time for the electric current applied to the electric motor 12 reaching the lock current value exceeds the threshold value. For example, the control means 11 may be modified so as to determine that the abnormality occurs only when the number of times when the electric current supplied to the electric motor 12 reaches the lock current value exceeds a predetermined number of times, so that the control means 11 does not determine that the abnormality occurs at the grille control mechanism when the movable members 21 are temporarily moved because of the air pressure, the impact or the like applied thereto and so that the control means 11 determines that the abnormality occurs at the grille control mechanism only when the movable members 21 are displaced multiple times because of a malfunction of the electric motor 12, a mechanical error or abnormality occurring on a power transmission system from the electric motor 12 through the movable members 21, and the like.

Other Embodiments

In the above-described embodiment, the control means 11 controls the electric current to be intermittently supplied to the electric motor 12 every predetermined time while the operation condition is maintained. However, the control means 11 may be modified so as to control the electric current to be supplied to the electric motor 12 in a case where the detection value from the speed sensor 13, an acceleration sensor or the like, which is provided at the vehicle, exceeds a threshold value. In other words, the air pressure, the impact and the like applied to the movable members 21 while the vehicle is moving may be detected by the speed sensor 13, the acceleration sensor or the like. Then, in a case where the detection value from the speed sensor 13, the acceleration sensor or the like exceeds the predetermined threshold value, the control means 11 may controls the electric current to be supplied to the electric motor 12 because the movable members 21 are more likely to be displaced from the opened position or the closed position when the determination value exceeds the threshold value.

In the above-described embodiment, each of the movable members 21 includes the main movable member 21a and the driven member 21b, as illustrated in FIGS. 1 and 2. However, the movable member 21 is not limited to the above-described configuration. For example, each of the movable members 21 does not need to include the main movable member 21a and the driven member 21b as different components, but all of the movable members 21 may be driven independently of each other. Furthermore, the rotating shaft 22 of the movable member 21 may be provided at other portion of the movable member 21 other than the end portion thereof.

Accordingly, the control means 11 is adaptable to the grille control mechanism for the vehicle for controlling the opening and closing operation of the movable members 21, which are configured so as to be switchable between the opened position for allowing the ambient air to flow into the radiator 3 and the closed position for inhibiting or preventing the ambient air from flowing into the radiator 3.

Accordingly, the electric current is intermittently supplied to the electric motor 12 in response to the continued operation condition until a different operation condition is satisfied after the movable members 21 are opened or closed in response to the satisfied opening operation condition or the closing operation condition. Then, the opening operation or the closing operation in response to the operation condition is repeated. Therefore, the grille control mechanism for the vehicle may appropriately adjust the actual position of the movable members 21 to correspond to the position where the movable members 21 should be, which is determined on the basis of the continued operation condition, in the case where the actual position of the movable members 21 does not correspond to the position where the movable members 21 should be. As a result, the overheating at the engine 2, which occurs when the movable members 21 are closed while the opening operation condition continues and the engine cooling medium is not sufficiently cooled down, may be avoided. Furthermore, the deterioration of the expected driving stability, which occurs when the movable members 21 are opened while the closing operation condition continues, may be avoided.

According to the embodiment, the control means 11 controls the electric current to be intermittently supplied to the electric motor 12 until the current value of the electric current reaches the lock current value.

Accordingly, because a termination of intermittent applying of the electric current to the electric motor 12 in response to the continued operation condition is determined on the basis of the electric current value, an additional position sensor and the like for detecting the position of the movable members 21 does not need to be provided at the grille control mechanism for the vehicle. Therefore, the manufacturing costs of the grille control mechanism for the vehicle according to the embodiment may be reduced. Furthermore, the grille control mechanism for the vehicle according to the embodiment may have more flexibility in being mounted on various types of vehicle. Additionally, according to the embodiment, because the control means 11 controls the supply of the electric current to the electric motor 12 to be stopped when the current value reaches the lock current value, the electric current does not need to be continuously supplied to the electric motor 12 after the movable members 21 reach the opened position or the close position. Therefore, an electric energy may be saved.

According to the embodiment, the control means 11 controls the electric current to be intermittently supplied to the electric motor 12 at the predetermined time interval.

Accordingly, because the control means 11 controls the electric current to be intermittently applied to the electric motor 12 every predetermined time in response to the continued operation condition, the movable members 21 may be returned to the opened position or the closed position where the movable members 21 are considered to be located in response to the operation condition every predetermined time in the case where the movable members 21 are displaced from the proper opened position or the closed position. Additionally, the movable members 21 may be surely returned to the position where the movable members 21 should be by adjusting the predetermined time in order to raise the frequency of supplying the electric current to the electric motor 12. Alternatively, the predetermined time may be adjusted so as to reduce the frequency of supplying the electric current to the electric motor 12 in order to enhance energy saving.

According to the embodiment, the predetermined time interval while the opening operation condition continues is set to be shorter than the predetermined time interval while the closing operation condition continues.

Accordingly, the intermittent opening operation, which is executed while the opening operation condition continues, is more frequently executed than the intermittent closing operation, which is executed while the closing operation condition continues. Generally, when the movable members 21 are displaced from the opened position, in the case where the movable members 21 should be positioned at the opened position, the engine cooling medium may not be sufficiently cooled down and the overheating may occur at the engine 2. On the other hand, when the movable members 21 are displaced from the closed position in the case where the movable members 21 should be positioned at the closed position, the driving stability of the vehicle may be deteriorated. In this embodiment, the prevention of the overheating is prioritized over the ensuring of the driving stability.

According to the embodiment, the control means 11 executes the abnormality determination of the operation state of the movable members 21 on the basis of the time duration until the current value of the electric current intermittently supplied to the electric motor 12 reaches the lock current value.

Accordingly, in a case where, for example, the duration of time until the current value reaches the lock current value is long, in other words, in the case where the movable members 21 are greatly displaced from the opened position or the closed position where the movable members 21 are considered to be located in response to the continued operation condition, the control means 11 may determine that the abnormality occurs. In the case where the grille control mechanism for the vehicle includes a means to warn or notify the abnormality or the error to the occupant via the warning lamp 50 and the like, the occurrence of the overheating at the engine 2, the deterioration of the driving stability or the like may be prevented from occurring.

According to the embodiment, the control means 11 executes the opening operation in the case where the operation state of the movable members 21 are determined to be abnormal as the conclusion of the abnormality determination.

According to the embodiment, the closing operation condition and the opening operation condition are set on the basis of the signals outputted from the speed sensor 13, the ambient temperature sensor 14 and the cooling medium temperature sensor 15.

According to the embodiment, the signal outputted from the sensor includes the signal outputted from at least one of the speed sensor 13, the ambient temperature sensor 14 and the cooling medium temperature sensor 15.

Accordingly, because the opening operation is executed in the case where the abnormality occurs to an operation state of the movable members 21, the engine cooling medium is sufficiently cooled down by the radiator 3, therefore, the overheating may be avoided from occurring at the engine 2.

The principles, preferred embodiment and mode of operation of this disclosure have been described in the foregoing specification. However, the disclosure which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the disclosure. Accordingly, it is expressly intended that all such variations, changes and equivalents which fall within the spirit and scope of the disclosure as defined in the claims, be embraced thereby.

The invention claimed is:

1. A grille control mechanism for a vehicle, comprising:
    a movable member, a position of which is switchable between an opened position for allowing an ambient air to flow into a radiator provided at the vehicle and a closed position for inhibiting or restricting the ambient air from flowing into the radiator;
    an electric motor actuating the movable member; and
    a control means controlling an electric current to be supplied to the electric motor in order to execute an opening operation or a closing operation of the movable member in a case where an opening operation condition for controlling the movable member to be at the opened position or a closing operation condition for controlling the movable member to be at the closed position is satisfied based on a signal outputted from a sensor, wherein
    the control means determines whether or not a maintained operation condition, which is one of the opening operation condition and the closing operation condition, is maintained for a predetermined time,
    the control means, in a case where the control means determines that the maintained operation condition is maintained for the predetermined time, controls the electric current to be supplied in order to execute one of the opening operation and the closing operation corresponding to the maintained operation condition, and the control means continuously controls the electric current to be supplied intermittently to the electric motor according to the maintained operation condition, until the control means determines that the maintained operation condition changes to the other one of the opening operation condition and the closing operation condition based on the signal outputted from the sensor.

2. The grille control mechanism for the vehicle according to claim 1, wherein for a single opening operation or a single closing operation, the control means controls the electric current to be supplied to the electric motor until a current value of the electric current reaches a lock current value.

3. The grille control mechanism for the vehicle according to claim 2, wherein the control means executes an abnormality determination of an operation state of the movable member based on a time duration until the current value of the electric current intermittently supplied to the electric motor reaches the lock current value.

4. The grille control mechanism for the vehicle according to claim 3, wherein the control means executes the opening operation in a case where the operation state of the movable member is determined to be abnormal as a conclusion of the abnormality determination.

5. The grille control mechanism for the vehicle according to claim 1, wherein the predetermined time interval while the opening operation condition continues as the maintained operation condition is set to be shorter than while the closing operation condition continues as the maintained operation condition.

6. The grille control mechanism for the vehicle according to claim 1, wherein the signal outputted from the sensor includes a signal outputted from at least one of a speed sensor, an ambient temperature sensor and a cooling medium temperature sensor.

7. The grille control mechanism for the vehicle according to claim 1, wherein in a case where the maintained operation condition changes to the other one of the opening operation condition and the closing operation condition, and the other one of the opening operation and the closing operation is executed, the control means determines whether or not the other one of the opening operation condition and the closing operation condition is maintained for the predetermined time, and wherein in a case where the control means determines that the other one of the opening operation condition and the closing operation condition is maintained for the predetermined time, the control means controls the electric current to be supplied so that the other one of the opening operation and the closing operation is executed.

\* \* \* \* \*